May 27, 1947. H. E. HUNTSBERY 2,421,330
RESILIENT TIRE
Filed June 28, 1945 2 Sheets-Sheet 1
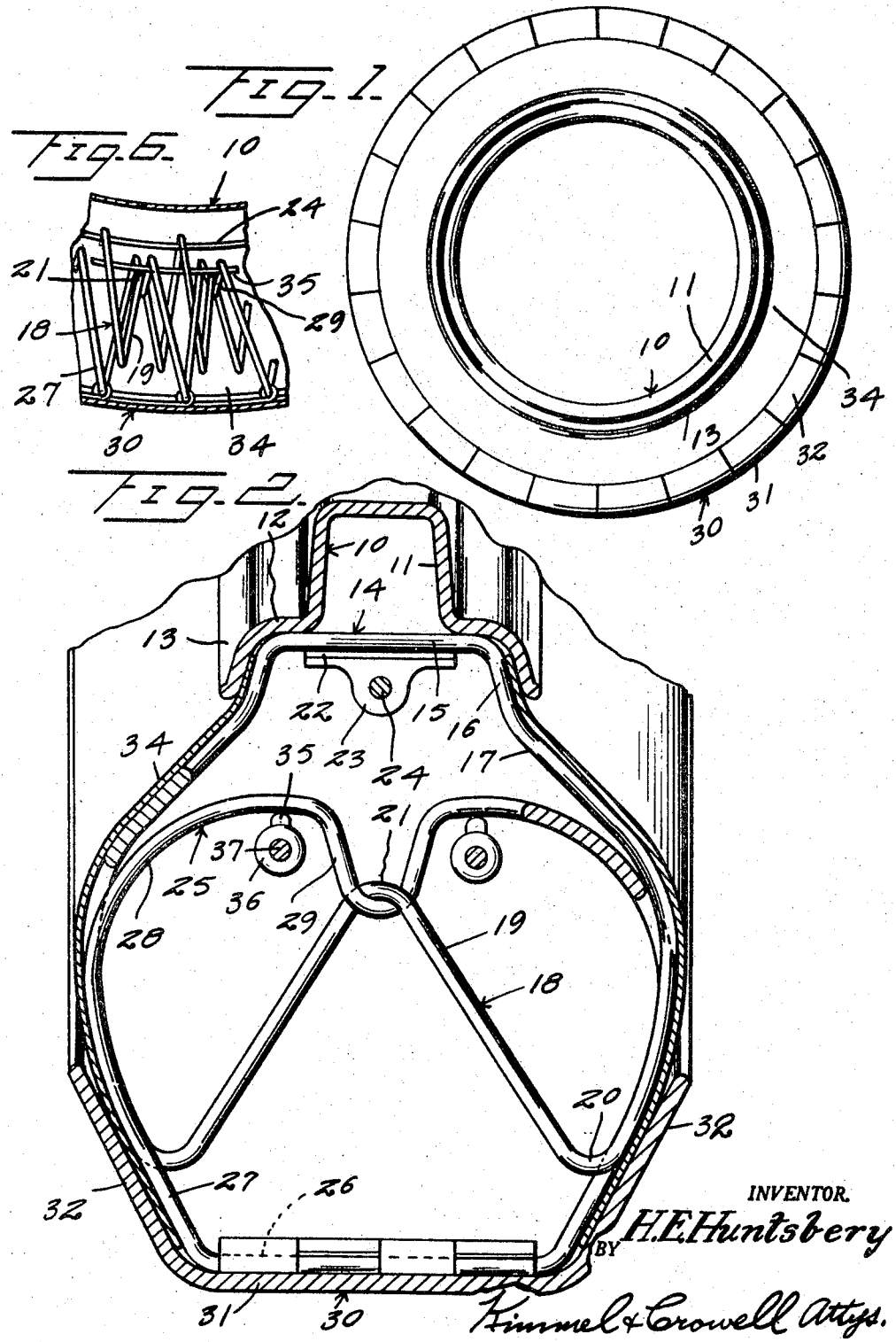
INVENTOR.
H.E.Huntsbery
BY
Kimmel & Crowell Attys.

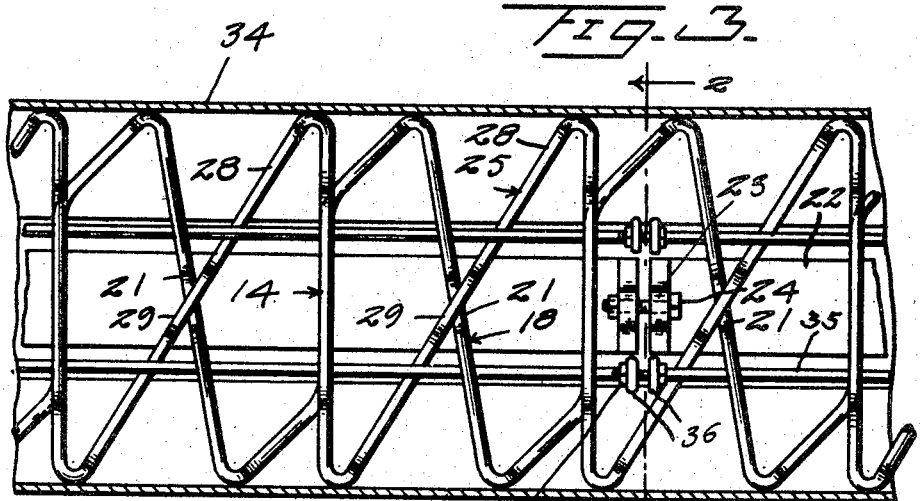
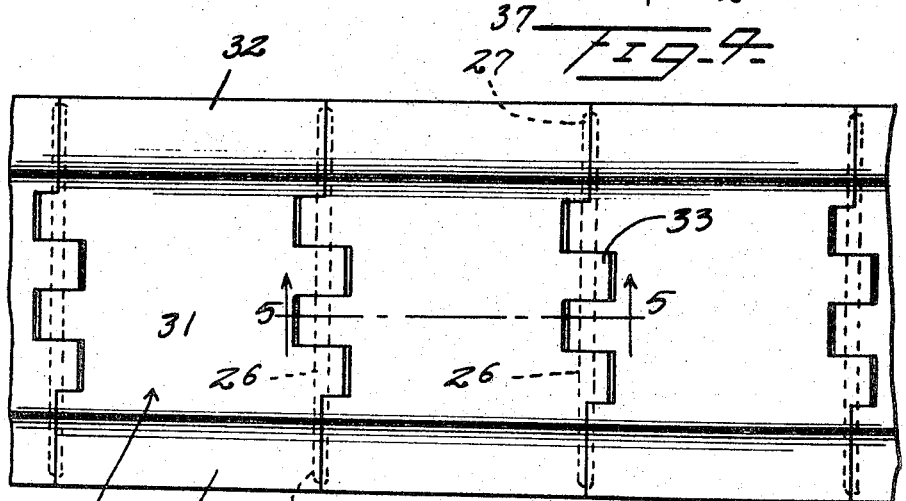
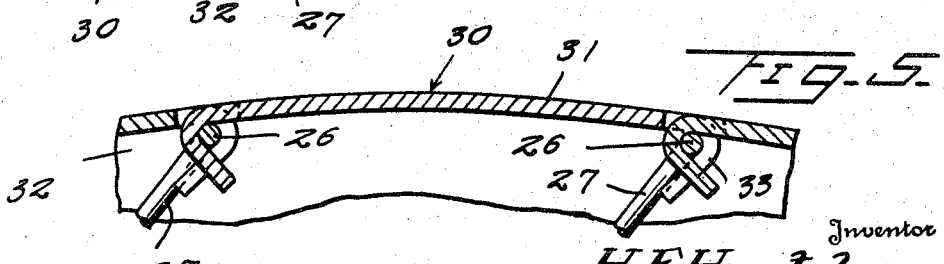

Patented May 27, 1947

2,421,330

UNITED STATES PATENT OFFICE 2,421,330

RESILIENT TIRE

Harlan E. Huntsbery, Washington, D. C.

Application June 28, 1945, Serial No. 602,064

3 Claims. (Cl. 152—287)

This invention relates to resilient metallic vehicle wheels.

An object of this invention is to form a vehicle tire which is formed of an inner resilient rim section, and a floating outer resilient tread section which are coupled together in a manner so that light and heavy loads will be smoothly supported.

Another object of this invention is to provide a resilient inner tire construction which may be positioned within an outer casing of suitable composition.

A further object of this invention is to provide a resilient inner tire construction which will eliminate inner tubes and will, at all times maintain the casing in operative condition.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that variations, and modifications may be resorted to which fall within the scope of the invention, as claimed.

In the drawings:

Figure 1 is a detail side elevation of a tire constructed according to an embodiment of this invention.

Figure 2 is a fragmentary transverse section taken substantially on the line 2—2 of Figure 3.

Figure 3 is a plan view, partly in section, of the resilient supporting means for the tire.

Figure 4 is a fragmentary plan view of the tread plate.

Figure 5 is a fragmentary sectional view taken substantially on the line 5—5 of Figure 4.

Figure 6 is a fragmentary side elevation, partly in section, of the inner portion of the tire.

Referring to the drawings the numeral 10 designates generally a vehicle rim which is formed with an annular well 11, and a flared rim member 12. The rim member 12 is outwardly flared as at 13 and is adapted to receive a resilient tire, as hereinafter described.

The rim structure 10, has mounted thereabout, the inner portion 14 of resilient tire construction The member 14 is constructed in circular configuration, being formed out of an elongated resilient wire which is bent in coil form so as to provide spaced apart convolutions. The inner coil section 14 is formed with an inner rim engaging bar 15 which extends across the well 11 and the bar 15 has extending from the opposite ends thereof, an outwardly and obtusely inclined bar 16 which merges with a longitudinally arcuate bar 17. The bar 17 has the concave side thereof innermost and has formed integral therewith a substantially V-shaped saddle, generally designated as 18. The saddle 18 includes a straight bar 19 which is integral with the side bar 17 being connected therewith by means of an arcuate connecting member 20. The connection between the two straight bars 19 is formed by an arcuate seat 21, the purpose for which will be hereinafter described.

In order to provide for maintaining the coil 14 tightly within the rim seat, I have provided an elongated flat band 22 which is welded or otherwise firmly secured to the series of straight bars 15. The ends of the band 22 have secured thereto eyes 23 which are disposed in confronting relation and through which a tensioning bolt 24 engages.

The inner coil 14, which constitutes the cushioning member, has disposed thereabout, an outer or tread coil, generally designated as 25. The tread coil 25 is formed from an elongated coiled wire of suitable resiliency and rigidity which is bent in coil form and includes an outer tread bar 26 which is preferably straight. The tread bar 26 has extending from the opposite ends thereof, longitudinally curved side forming bars 27 and the side forming bars 27, at a point substantially midway of the radial thickness of the tire, have formed integral therewith, an inwardly curved supporting bar 28. The two supporting bars 28 are disposed in confronting relation and have formed integral therewith a substantially U-shaped saddle 29.

The U-shaped saddle 29 intersects and engages in the apex or inner angle of the saddle 18 of the inner coil so that the pressure on the tread bar 26 will cause the resilient arms 28 to flex and the pressure on the saddle 18 by the saddle 29 will cause the outer ends of the side bars 17 of the inner coil section, to also flex inwardly. In the event an excessive load is applied to the tire the outer tread coil 25 will be flexed inwardly of the point where the arcuate connecting members 20 will be substantially flush with the outer ends of the tread bars.

In order to provide a continuous surface for the tread bars 26 these bars, which extend transversely across the tire, are connected together in pairs by means of tread plates 30. The tread plates 30 include an outer tread member 31 which has formed integral with the opposite outer edges, inwardly divergent side members 32. Each tread plate 31 has formed integral with the opposite ends thereof, open hinge barrels 33 which engage over the transverse tread bars 26, as shown in Figure 5, and the barrels of one tread plate 31 are adapted to intermesh with the barrels of an adjacent tread plate, as shown in Figure 4.

The tread plates 31 and side members 32 are so positioned relative to the adjacent tread plates that the slight distance therebetween is sufficient to permit the deformation of the tire at the bottom thereof due to excess loads or upon encountering obstacles, the relationship shown in Figure 1 being that of the plates in their normal position when the tire is supporting no load.

The two coils 14 and 25 may be covered so as to prevent dirt or other material from entering into the convolutions of the coils by means of a pair of circular side wall members 34. The side wall members 34, at their outer edges, are interposed between the divergent tread members 32, and the adjacent portions of the tread coil 25 and the inner coil 14. The inner edges of the side wall members 34 are interposed between the inner portions of the inner coil 14 and the divergent sides 13 of the rim.

The tread coil 25 is locked with respect to the inner coil 14 by means of a pair of circular bars 35 which are secured to the inner portions of the extensions 28 on the outer sides thereof and the ends of the bars 35 are formed with confronting eyes 36 through which tightening bolts 37 are adapted to engage. In this manner the tread coil 25 will be resiliently locked to the inner coil 14.

In the use and operation of this tire construction the coils 14 and 25 are mounted on the rim 10 by the loosening of the bolts 24 and 37. The inner coil 14 is positioned about the rim 10, and then tightened in the rim by means of the bolt 24 and engaging through the eyes 23. The outer tread coil 25 is also tightened by adjustment of the bolts 37 which engage through the eyes 36. The tread plates or members 30 may be formed out of metal or other suitable material and, if desired, these tread members 30 may be covered by a resilient casing which may be formed out of rubber, composition or the like. When weight is applied to the tire, this weight will initially be borne by the two coil members, the outer coil member 25 pressing inwardly against the tension of the arcuate side members 17 of the inner coil 14. The distance or space between the outer ends of the side members 17, and the tread bars 26, is preferably sufficient to provide for sustaining normal weights which are carried by the tire. Where extra heavy weights are encountered or where the tire rides over an obstruction, the extra weight is borne by the outer ends 20 of the inner coil member 14, as at this time the outer ends 20 of the side members 17 will be positioned at the angle formed by the side members 32 of the tread members 30. It will be apparent from the foregoing that a resilient tire construction has been provided which will take the place of pneumatic tires or inner tubes.

The tire construction herein disclosed can be manufactured at small cost and will obviously eliminate all blowouts or punctures. The inner and outer resilient coils may be made out of tempered wire of suitable gage or thickness which is designed to bear a predetermined normal load or weight.

The side members 32 will provide a means to prevent collapse or distortion outwardly of the inner and outer coils as the side members are of sufficient width to encompass the outer portions of both coils and are also of sufficient rigidity to reinforce the coils. In this manner there is provided a substantial truss formed by the interengaging saddles 18 and 29 and by the outer bars 17 and 27 of the inner and outer coils respectively. Any overload will be resiliently borne by the two intermeshed coils, and these coils are at all times prevented from completely collapsing or becoming unduly distorted.

I claim:

1. A tire construction comprising an inner annular wire coil, an outer wire coil, confronting interengaging saddle members carried by said coils whereby said outer coil will be resiliently supported by said inner coil, tread members carried by said outer coil, a pair of split circular contracting members fixed to the convolutions of said outer coil at the inner portions thereof, and means drawing the ends of said contracting members together whereby to hold said outer coil about said inner coil.

2. A tire construction comprising an inner annular wire coil, an outer wire coil, the convolutions of said inner coil being formed with inverted V-shaped saddle members, U-shaped saddle members on said outer coil, the bight of said U-shaped members engageable with the apex of an adjacent V-shaped saddle member whereby said outer coil will be resiliently supported by said inner coil, tread members carried by said outer coil, a pair of split circular contracting members fixed to the convolutions of said outer coil at the inner portions thereof, and means drawing the ends of said contracting members together whereby to hold said outer coil about said inner coil.

3. A tire construction comprising an inner annular wire coil, an outer wire coil, inverted V-shaped saddle members on the outer portions of said inner coil, U-shaped saddle members on the inner side of said outer coil, the bight of said U-shaped saddle members engaging in the apex of said V-shaped saddle members whereby said outer coil will be resiliently supported by said inner coil, a pair of split circular contracting members fixed to the convolutions of said outer coil adjacent said U-shaped saddle member, and means drawing the ends of said contracting members together whereby to hold said outer coil about said inner coil.

HARLAN E. HUNTSBERY.

REFERENCES CITED

The following references are of record in the file of this patent:

UNITED STATES PATENTS

| Number | Name | Date |
| --- | --- | --- |
| 1,020,464 | Temple | Mar. 19, 1912 |
| 907,191 | Sower | Dec. 22, 1908 |
| 2,137,670 | Gillespie | Nov. 22, 1938 |

FOREIGN PATENTS

| Number | Country | Date |
| --- | --- | --- |
| 395,436 | France | 1909 |
| 41,700 | Sweden | 1915 |